April 20, 1937. H. F. LEWIS 2,077,786
ARTICLE ASSEMBLING CONVEYER MECHANISM
Filed July 26, 1935

INVENTOR.
HARRY F. LEWIS
BY Walter L. Pipes
ATTORNEY

Patented Apr. 20, 1937

2,077,786

UNITED STATES PATENT OFFICE 2,077,786

ARTICLE ASSEMBLING CONVEYER MECHANISM

Harry F. Lewis, Hamden, Conn., assignor to United States Rubber Products, Inc., New York, N. Y., a corporation of Delaware Application July 26, 1935, Serial No. 33,235

10 Claims. (Cl. 12—1)

This invention relates to an article assembling conveyer mechanism, and more particularly to an automatic lasting jack turning device for footwear assembling conveyers.

In the making of rubber footwear the practice for many years was for an individual operator to completely assemble a footwear article on a last, performing all operations up to the completion of the article. More recently rubber footwear has been assembled on conveyers, the conveyers carrying a series of spaced lasting jacks supporting the lasts on which the articles are to be assembled, and the operators being stationed along the conveyer at suitable intervals with each operator carrying out a predetermined portion of the assembling operation. It is obvious that with such a method of assembling footwear, the longest time required by an operator at any one station determines the speed of the entire assembling operation, and the time at a station is measured in seconds. Therefore, even the smallest saving in time at the stations is of value for speeding up the operation of the conveyer as a whole. For convenience in assembling, it is necessary that the footwear last on the jack be presented in different positions at the different stations, or that it be turned by the operator at any station during the carrying out of his assigned assembling operation, and in order to permit this it is customary to use adjustable lasting jacks so that the last may be turned as desired. Obviously, after an operator has completed his assigned duty at one station, the operator at the next station may require that the jack be in a different position, and one or the other of the two operators must manually turn the jack. Also, it is now common to perform certain of the operations at given stations, such as pressing or rolling, by automatic machinery, which machinery requires that the last be presented to it in a definite position, and therefore it has been necessary for the operator at a station preceding that at which the automatic machinery is located to see that the last leaving his station is in proper position to pass to the automatic machine. It may even be the case that operations at two succeeding stations are both carried out by automatic machinery, and that these machines require the last to be presented in different positions, and in such case it is necessary that an operator be stationed to properly present the last. These turning operations to position the last for a succeeding operation require an extra manual operation which slows down the speed of the conveyer.

An object of my invention is to speed up footwear assembling conveyers in operation.

Another object is to provide an automatic last jack turning device for footwear assembling conveyers.

Other objects will appear from the detailed description and drawing, in which latter:

Figure 1:
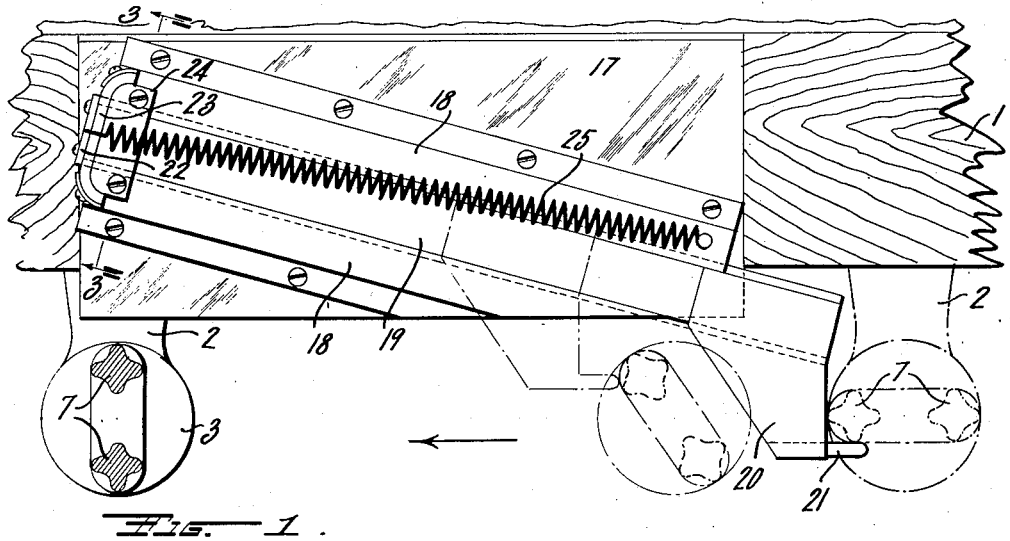
Fig. 1 is a broken away plan view of a footwear assembling conveyer illustrating the automatic last jack turning device.
Figure 2:
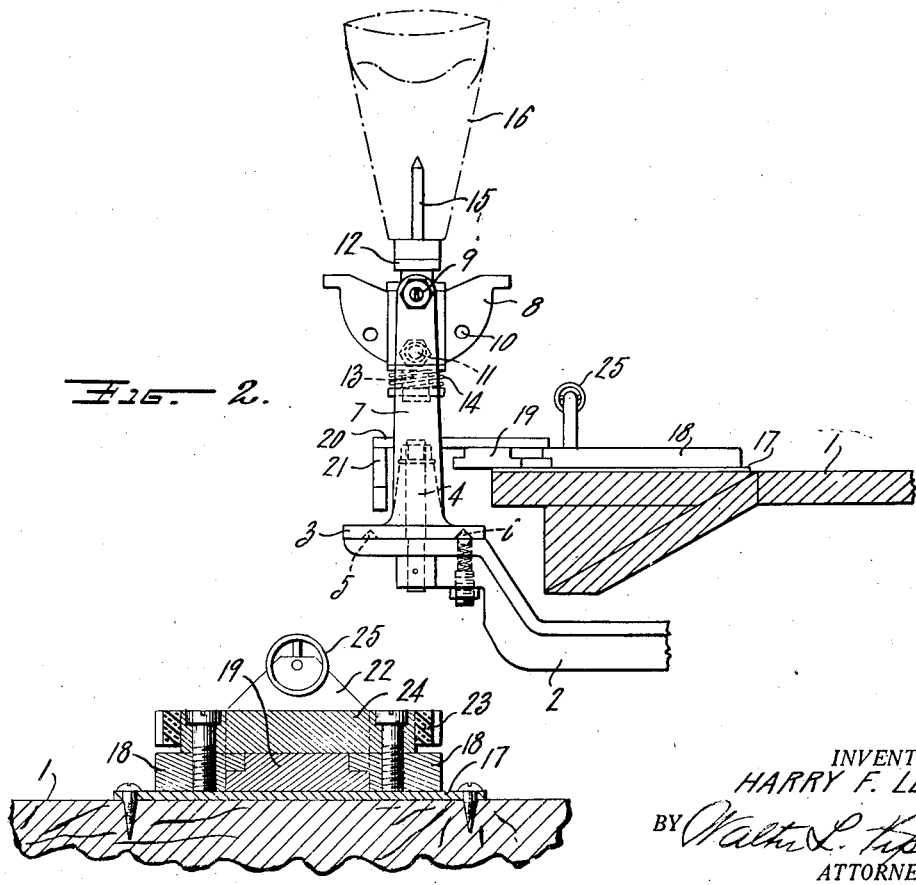
Fig. 2 is a side elevation partly in section illustrating the device.
Figure 3:
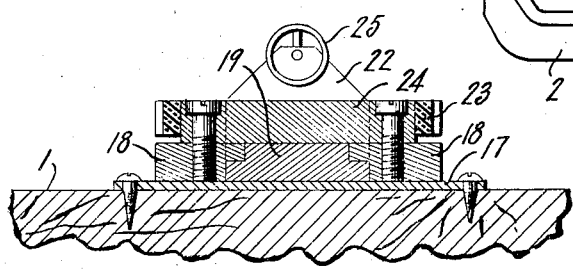
Fig. 3 is a detailed section on the line 3—3 of Fig. 1.

Referring to the drawing there is shown in Fig. 1 a portion of a conveyer table designated by the numeral 1. Movable along the edge of the table are a series of suitably spaced last jack supporting arms 2 which extend beneath the table and are connected to any suitable form of conveyor, such as that shown in patent to Patten No. 1,953,256, issued April 3, 1934. In order to illustrate the invention on a large scale but one of the last jack supporting arms is shown. Attached to each last jack supporting arm 2 is an adjustable lasting jack, which may be of any suitable type such as that shown in patent to Patten No. 1,498,400, issued June 17, 1924. In brief this form of lasting jack comprises a base 3 which is rotatably mounted on the supporting arm by the pivot pin 4, and in order to hold the jack in rotatably adjusted position, the lower side of the base 3 is provided with recesses 5 adapted to be engaged by the spring pressed ball detent 6. The base is usually provided with four recesses 5 spaced 90° apart, so that when the base is rotated the ball detent may yieldingly hold it in positions 90° apart, that is, any adjusted position is at right angles to the immediately preceding one.

Extending upwardly from the base of the jack are yoke arms 7, and a quadrant carrying member 8 is pivotally mounted in the arms at 9. The quadrant member is provided with recesses 10 adapted to be engaged by the ball detent 11 carried in one of the arms 7, so that the quadrant member may be yieldingly held in a number of different angular positions. A last pin support 12 is rotatably mounted in the quadrant member 8 on a pin 13 and is frictionally held against rotation by the coil spring 14. The last pin support carries pins 15 upon which the last 16 is mounted.

The last jack turning device comprises a plate 17 mounted on the conveyer table 1, to which plate are secured the spaced slide-ways 18, these slide-ways being inclined to the path of the moving jacks at a small angle which may be about 15°. Movable in the slide-ways 18 is a slide 19 which is provided at its end nearest the path of the jacks with a jack engaging member 20 provided with the extending turning arm 21. At the opposite end of the slide 19 it is provided with a stop plate 22 adapted to engage a rubber bumper 23 mounted on a bumper block 24 secured to the slide-ways 18. A coil spring 25 is secured at one end to the stop plate 22 and at the other end to one of the slide-ways 18, and the action of this spring is to normally retract the slide into such position that the stop plate 22 engages the bumper 23 and the jack engaging member 20 and turning arm 21 are disposed in the path of the moving jacks.

In operation the jacks are moved by the conveyer in the direction of the arrow as shown in Fig. 1, and as a jack reaches the member 20 it pushes the slide 19 forwardly and inwardly or laterally, and in this movement the extending arm 21 moves forwardly and laterally, its lateral movement causing the jack as a whole to be turned upon its pivot pin 4. The turning movement of the jack is continued until it is turned through an angle of 90° and the ball detent 6 engages a succeeding recess 5 in the base of the jack, and at this time the arm 21 passes around the rounded side edge of the jack and is freed therefrom. The spring 25 then retracts the slide 19 until the stop plate 22 engages the bumper 23 and the parts 20 and 21 are again disposed in position to be engaged by a succeeding jack. The conveyer is operated at a relatively slow speed, say about 16 feet per minute. The contact of the jacks with the member 20 is therefore not a jarring or striking one but a slow, pushing one, and the turning of the jacks is accomplished without any tendency to jam or break them.

It will be seen that by the invention the operation of turning the lasting jack through an angle of 90° is performed entirely automatically. Obviously other forms of adjustable lasting jack may be employed, and in such case the jack and the jack engaging end of slide 19 will be properly shaped for the purpose. By the use of the turning device, an operator is therefore freed from the necessity of turning the lasting jack, with a consequent saving in time which may be utilized for other purposes. Also in the case where an automatic machine is disposed at any station along the conveyer, the device of the present invention may be used either in advance of it to turn a jack to a desired position before reaching the machine, or the device may be disposed in rear of the automatic machine to turn a jack to proper position for a succeeding operator or a succeeding machine, or the device may be placed both in advance and in rear of a machine.

The device is of course applicable to other assembling conveyers where an article is assembled on an adjustable support.

While a specific embodiment of the invention has been shown and described, it is obvious that modifications may be made therein and it is not desired to limit the invention otherwise than as required by the prior art, and by the scope of the appended claims.

Having thus described my invention, what I claim and desire to protect by Letters Patent is:

1. In an article assembling conveyer, a series of article supports each rotatable on a vertical axis and movable in a closed path by the conveyer, and means at a fixed point in said path laterally movable by the engagement of a support therewith, said means in said lateral movement imparting a limited movement of rotation to said support.

2. In an article assembling conveyer, a series of rotatable article supports movable by the conveyer, means normally in the path of and movable by the engagement of a support therewith for imparting a limited movement of rotation to said support, and means for returning said first means to a position for engaging a succeeding support.

3. In an article assembling conveyer, a series of rotatable article supports movable in a fixed path by the conveyer, a slide normally disposed in and inclined to the path of said supports adapted to be directly engaged by a support and laterally movable thereby to partially rotate the support, and means for returning said slide to its initial position for engagement by a succeeding support.

4. In a footwear making conveyer, a series of rotatable footwear lasting jacks movable in a fixed path by the conveyer, a slideway adjacent the path of said jacks and slightly inclined away from said path in the direction of travel of the jacks, a slide movable in said slideway and provided with a jack engaging member adapted to be directly engaged by a jack in one position of the slide to thereby move the slide and turn the jack, and resilient means for returning the slide to said position.

5. In a footwear making conveyer, a series of footwear lasting jacks movable in a fixed path by the conveyer, each jack being rotatably mounted and having resilient means for holding it in a plurality of rotated positions, and means normally in the path of said jacks and adapted to be successively directly engaged by them for turning the jacks from one rotated position to another.

6. In a footwear making conveyer, a series of footwear lasting jacks movable in a fixed path by the conveyer, each jack being rotatably mounted and having resilient means for holding it in a plurality of rotated positions, jack engaging means normally disposed in the path of said jacks and movable by a forwardly moving engaged jack, and means for causing said jack engaging means to be moved laterally simultaneously with its forward movement by the jack, whereby the engaged jack is rotated from one position to another.

7. In a footwear making conveyer, a series of footwear lasting jacks movable in a fixed path by the conveyer, said jacks being rotatably mounted and each having resilient means for holding it in a plurality of rotated positions, an inclined slide disposed adjacent the path of said jacks, said slide inclined away from said path in the direction of movement of said jacks, a jack engaging member carried by said slide, and means for moving said slide in a direction to present said member for engagement by a jack.

8. In a footwear making conveyer, a series of rotatable footwear lasting jacks movable in a fixed path by the conveyer, means adapted to be engaged by successive jacks and to be moved forwardly and laterally by such engagement to thereby partially rotate the engaged jack, and means for returning said first means to its initial position after engagement by each jack.

9. In a footwear making conveyer, a series of rotatable footwear lasting jacks movable in a fixed path by the conveyer, resiliently held detents for retaining each jack in any one of a plurality of rotated positions, a jack turning device adapted to be engaged by a jack at a fixed point in its path and movable forwardly and laterally by such engagement to thereby turn the jack from one rotated position to a succeeding one, and means for returning said device to position for engagement by a succeeding jack.

10. In a footwear making conveyer, a series of rotatable footwear lasting jacks movable in a fixed path by the conveyer, resiliently held detents for retaining each jack in any one of a plurality of rotated positions, a slideway having one end adjacent the path of said jacks, said slideway being inclined away from said path in the direction of travel of the jacks, a slide movable in said slideway and having a jack engaging member at its end nearest said path, said member normally being disposed in the path of said jacks and adapted to engage the advance portion of an approaching jack, whereby on movement of the slide by the jack the latter is turned from one rotated position to a succeeding one, and a spring attached to said slide for returning said member to position for engaging a succeeding jack.

HARRY F. LEWIS.